United States Patent
Dainese

(10) Patent No.: US 12,012,065 B2
(45) Date of Patent: Jun. 18, 2024

(54) PROTECTIVE DEVICE AND METHOD FOR MAKING SAID PROTECTIVE DEVICE

(71) Applicant: D-AIR LAB S.R.L., Vicenza (IT)

(72) Inventor: Lino Dainese, Vicenza (IT)

(73) Assignee: D-AIR LAB S.R.L., Vicenza (IT)

( * ) Notice: Subject to any disclaimer, the term of this patent is extended or adjusted under 35 U.S.C. 154(b) by 0 days.

(21) Appl. No.: 17/757,247

(22) PCT Filed: Dec. 9, 2020

(86) PCT No.: PCT/IB2020/061689
§ 371 (c)(1),
(2) Date: Jun. 13, 2022

(87) PCT Pub. No.: WO2021/116931
PCT Pub. Date: Jun. 17, 2021

(65) Prior Publication Data
US 2023/0001879 A1    Jan. 5, 2023

(30) Foreign Application Priority Data

Dec. 13, 2019  (IT) .......................... 102019000023958
Dec. 13, 2019  (IT) .......................... 102019000023961
Dec. 13, 2019  (IT) .......................... 102019000023964

(51) Int. Cl.
*B60R 21/239*    (2006.01)
*A41D 13/018*   (2006.01)

(52) U.S. Cl.
CPC .......... *B60R 21/239* (2013.01); *A41D 13/018* (2013.01)

(58) Field of Classification Search
CPC .... A41D 13/018; B60R 21/23; B60R 21/239; B60R 21/20
See application file for complete search history.

(56) References Cited

U.S. PATENT DOCUMENTS 7,574,755 B1 *   8/2009   Alston .................... B62J 27/20
                                                                2/463
2004/0183283 A1   9/2004   Buckman et al.
(Continued)

FOREIGN PATENT DOCUMENTS

CN    109998200 A    7/2019
EP      2621297 B1    8/2017
(Continued)

OTHER PUBLICATIONS

International Search Report and Written Opinion for International Application No. PCT/IB2020/061689, European Patent Office, Netherlands, mailed May 3, 2021, 9 pages.

*Primary Examiner* — Jason D Shanske
*Assistant Examiner* — Matthew James O'Neill
(74) *Attorney, Agent, or Firm* — LUCAS & MERCANTI, LLP

(57) ABSTRACT

The present disclosure relates to a protective device (10, 110) for the protection of a user. The protective device (10) comprises a mesh structure (11, 111) comprising a first mesh portion (18, 118) and a second mesh portion (19, 119) and a plurality of tie elements (5), wherein said first mesh portion (18, 118) and said second mesh portion (19, 119) are opposite one another and are connected one another by the plurality of tie elements (5); wherein the first mesh portion, the second mesh portion and the tie elements define one or more inner housings of the mesh structure (11, 111). The protective device (10, 110) includes a casing body (40, 42, 43) disposed in one or more of said inner housings, wherein said casing body is configured to assume a deflated condition and an inflated condition in the one or more inner housings of the mesh structure (11, 111).

22 Claims, 7 Drawing Sheets

(56) References Cited

U.S. PATENT DOCUMENTS

| | | | | |
|---|---|---|---|---|
| 2012/0032422 A1* | 2/2012 | Dainese | ................... | B62J 27/20 |
| | | | | 280/728.1 |
| 2016/0088883 A1* | 3/2016 | Azzolin | ............... | A41D 13/018 |
| | | | | 2/455 |
| 2021/0329986 A1* | 10/2021 | Mazzarolo | ........... | A41D 31/185 |

FOREIGN PATENT DOCUMENTS

| | | |
|---|---|---|
| EP | 3291697 B1 | 12/2018 |
| KR | 20170123046 A | 11/2017 |
| WO | WO-2011148353 A1 | 12/2011 |

\* cited by examiner

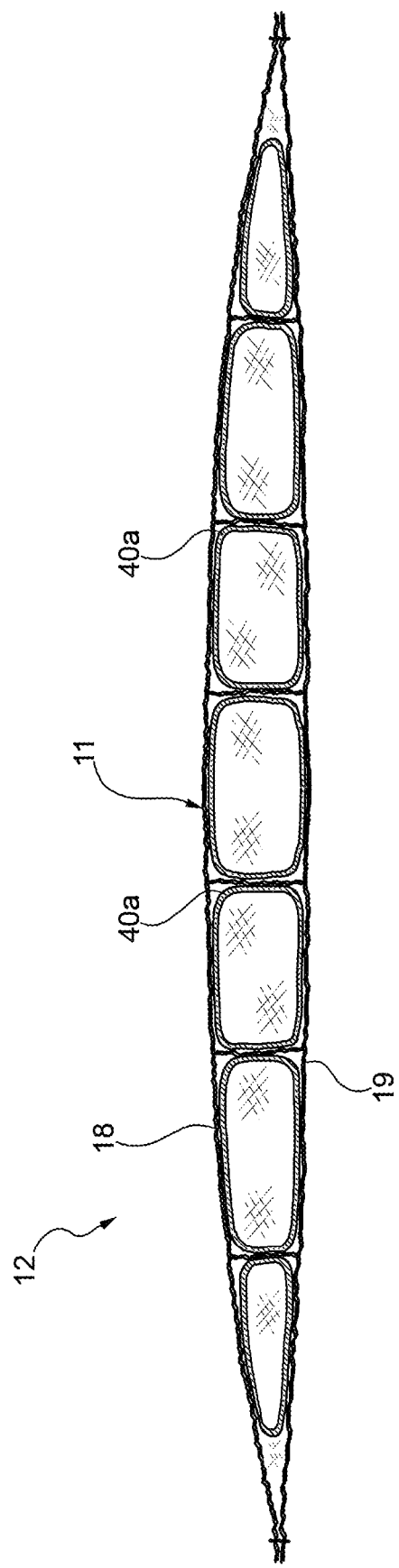

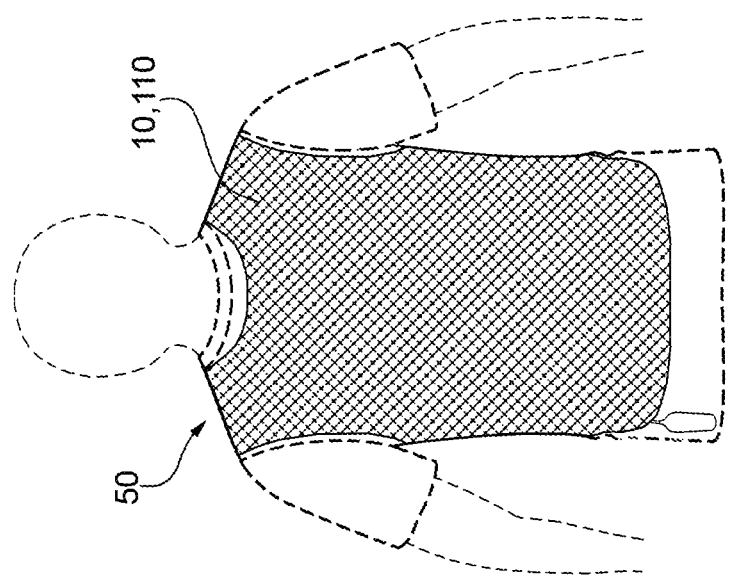
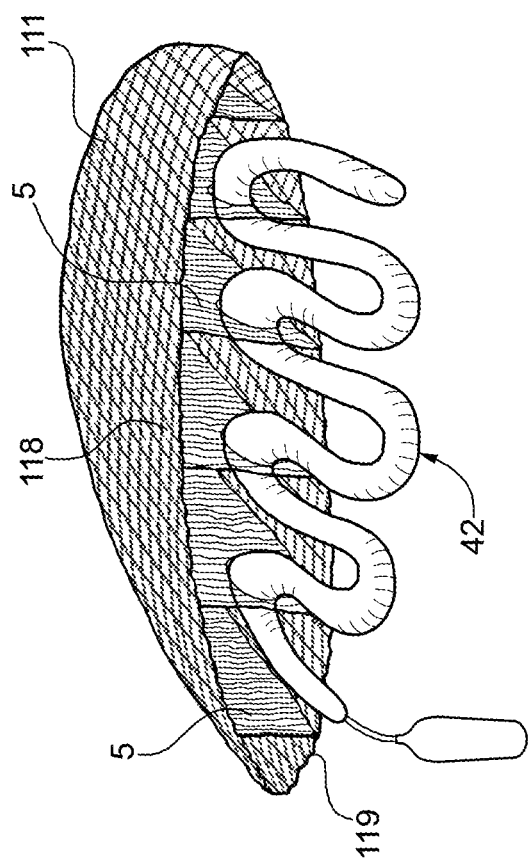

PROTECTIVE DEVICE AND METHOD FOR MAKING SAID PROTECTIVE DEVICE

The present disclosure generally refers to a protective device for protecting a user. It is preferably a wearable protective device. The protective device includes an inflatable element which, in an inflated condition, is configured to protect a passenger, motor vehicle rider or similar user from impacts and/or falls, during a sporting and/or working activity and/or any other activity.

A known protective device is for example the one described in the European patent EP3291697B1. Such a device includes an inflatable element apt to assume an active inflated condition and a deflated rest condition. The inflatable element includes a body made of mesh, that is, made by knitting. Said mesh body is a closed, or at least tubular, structure defining an inner region, or area, or chamber. This inner chamber is occupied at least partially by a plurality of joining threads connecting opposite portions of the mesh body to each other. The fact of making a single mesh body has the advantage of containing manufacturing waste and minimizing production times; in fact joining threads and meshes can be machined with a single knitting machine. The joining threads are part of a single thread connected to opposite portions of the mesh body. In particular, the thread passes alternately and continuously between a first portion and a second portion of the mesh body.

The inflatable element also includes waterproofing walls arranged externally that allow to contain the inflation fluid for a certain period of time. The walls are, for example, a first sheet, or first wall, and a second sheet, or second wall, fixed to each other along their respective perimetric edges. Said first and second sheet cover and line the mesh body on an external side or surface.

An inflatable element thus made, while being very advantageous from many points of view, nevertheless has the disadvantage of not always allowing adequate transpiration in a garment where it is integrated or inserted. In particular, the inflatable element in a deflated condition can create a sort of bag around the user's body that does not allow adequate passage of ventilation air. To overcome this problem, it has been proposed to fold the inflatable element in a deflated condition and make it expand and occupy a more extended position in the inflated condition so that when the inflatable element is at rest and not in use there are minimal areas with little transpiration. Even this solution, while advantageous from many points of view, has some drawbacks, as it is not always possible to place the inflatable element in a deflated position and in any case a control of the expansion of the inflatable element is required at the time of inflation.

A technical problem underlying the present disclosure resides in providing a protective device for the protection of a user capable of overcoming the drawbacks of the known art and allowing greater transpiration and/or to achieve further advantages, and to provide a garment including said personal protective device.

This problem is solved by a protective device for the protection of a user, by a protective garment or accessory for a garment, and by a production method for manufacturing a protective device according to the respective independent claims.

Secondary characteristics of the object of this disclosure are defined in the respective dependent claims.

A protective device according to the present disclosure for the protection of a user comprises a mesh structure including a first mesh portion and a second mesh portion, wherein the first mesh portion and the second mesh portion are opposed one another and connected one another by a plurality of tie elements to define one or more housings. Furthermore, the protective device comprises at least one inflatable casing body housed in the inner area, therefore in said one or more housings, between the first mesh portion and the second mesh portion. The inflatable casing body is preferably a simple mono-layer structure, similar to a balloon. More particularly, and preferably the casing body is a flexible, preferably mono-layer, extensible body made of elastic material In the deflated condition, the casing body occupies a space smaller than the space available in the respective housing, so as to determine a free region. In this way, the free region, which is actually defined by the mesh structure, allows transpiration when the protective device is used.

In other words, the casing body occupies a first region of the housing in a deflated condition and a second region of the housing in an inflated condition. The first region is apt to house the casing body in a deflated condition and the second region lacks or is free of the casing body in a deflated condition. The second region receives the casing body in the inflated condition and is open towards the first region to house the casing body, in an inflation step from the deflated condition to the inflated condition. In fact, by inflating the casing body expands as much as possible in the housing until it occupies all the available space, and until it is blocked by the mesh structure and the tie elements that essentially "bridle it".

In other words, the aforementioned technical problem can be solved by means of a mesh structure which houses inside thereof a casing body which is intended to be inflated to also inflate the mesh structure, and to make the mesh structure an inflatable structure. The mesh structure contains the inflation of the casing body. The casing body in the deflated condition does not form any additional layer for the protective device in the second region. The second region houses the casing body only in the inflated condition and is open towards the first region to receive the casing body, for example in an inflation phase from the deflated condition to the inflated condition.

The protective device can therefore be housed in a portion of the garment. This portion is to be understood as a garment portion that dresses a part of the body, such as the bust (neck region, chest region, shoulder joint region, back and arms). The portion of the garment is made according to a predefined textile technology apt to give certain characteristics to the garment, such as transpiration, or having ventilation openings. It follows that, once housed in the garment, the second region of the protective device allows to ensure the garment transpiration and ventilation.

The protective device preferably further includes a gas source connected to the inflatable casing body for inflating the inflatable casing body between a first deflated condition and a second inflated condition.

The inflatable casing body is therefore a flexible body, which in an inflated condition keeps this condition at least once for a determined period. Preferably it is a body impermeable to the inflation gas. In this case, a vent valve is provided to deflate the casing body. The casing body is preferably a tubular body or including tubular portions, preferably having high expansion capacities.

The housings are preferably channel-shaped to favour the insertion of the casing body.

As anticipated above, in the deflated condition the casing body can occupy a minimum space between the mesh portions, and therefore allow maximum ventilation of the item of clothing or garment. A body made of a preferably very elastic and expandable material, and which can ensure gas tightness for at least a certain time can be used as a casing body. It is, for example, a membrane or film in latex, polyurethane, polypropylene, polyester, polyamide. Inflation occurs at the moment of impact or when it is needed.

When the inflatable casing body is inflated it preferably occupies all or almost all of the housing where it is housed until the tie elements are tensioned. The maximum tension of the tie elements determines the maximum possible distance between the first mesh portion and the second mesh portion. It is thus obtained a protective device wherein the mesh portions and the casing body define an inflatable element, that is to say an element which is configured to assume at least an active inflated configuration and a rest deflated configuration.

The mesh portions represent an external side of the inflatable element and the inflatable casing body represent an inner side of the inflatable element. There are therefore advantageously no external walls which can stiffen the inflatable component too much. Possibly there may be reinforcing layers, possibly of minimal dimensions.

With the expression mesh structure, or preferably mesh textile structure, or mesh portion it is meant in a broad sense a real mesh, or even a fabric, even a net. Alternatively, it can be a so-called shuttle-weaved material, or needled materials (non-woven fabric). What is important is that it is a perforated structure or capable of creating a frame or cage that can be tensioned around the casing body, and that allows air or other gas to pass. Therefore the mesh structure is to be considered as a cage structure which traps and blocks or contains expansion of the casing body. Therefore, by appropriately shaping the structure or body including the two mesh portions with the tie elements and possibly providing different lengths for the tie elements according to their location in the chamber itself, it is possible to determine a priori the shape assumed by the inflatable element in an inflated condition (both in terms of distance between the two meshes, and in terms of the perimetric shape of the two mesh portions).

It can be a structure that can be more easily customized for a user, with a wide variety in terms of resistance, flexibility, colours, types of threads and yarns etc. . . .

Also with the term tie element is meant an element in the broad sense, that is to say an element which is tensioned between the two mesh portions when the inflatable casing body is inflated. The tie element could also be a stitch.

The tie elements can alternatively be threads, or pieces of fabric, or ribbons, in other words they can be dividing walls connecting mesh portions of the mesh structure. Said dividing walls can also be tensioned. The tie elements can be arranged in such a way that a first group of tie elements is arranged in a crossing or oblique condition with respect to a second group of tie elements.

The tie elements can also be made as stitches or topstitching.

It follows that mesh portions (including shuttle weaving or needled materials (non-woven fabric) with seam construction can be provided. The first deflated condition of the casing body corresponds to the rest deflated condition of the inflatable element and the second inflated condition of the casing body corresponds to the active inflated condition of the inflatable element. It follows that the first mesh portion and the second mesh portion, together with the tie elements, act as a cage or frame for the containment the inflation of the inflatable casing body. The casing body actually coats from inside the mesh textile structure, at the time of inflation, while it is slack in the deflated condition.

In other words, it should be noted that a condition of at least partial tension of the tie elements corresponds to the active inflated configuration of the inflatable element, and a condition of at least partial loosening, and generally a slack condition, of the tie elements and the mesh structure corresponds to the rest deflated configuration of the inflatable element. The casing body or the casing bodies are therefore arranged with clearance in the inner area of the mesh structure in a deflated condition.

In this way, preferably, when the casing body is tensioned, the whole inflatable element is tensioned. In this way, by appropriately calibrating the shape of the housings, the shape of the casing body, the length of the tie elements, the configuration of the mesh portions, the final shape of the inflatable element can be calculated a priori.

In the inflated condition, the casing body at least partially lines the first mesh portion and the second mesh portion, in contact.

The first mesh portion and the second mesh portion together with the tie elements determine with the casing body the final shape of the inflatable element. For example the inflatable element can reach a generally flat and planar final shape.

In addition, thanks to the shape control, the inflatable element can be easily coupled to other devices or protective elements independent of the inflatable element, and having a shape conjugated to that of the inflatable element in the inflated condition.

A further advantage lies in the fact that the tie elements ensure a limited expansion of the inflatable element in an inflated condition in order to obtain a reduced bulk, and in particular a limited thickness, and at the same time ensuring adequate protection for a user.

As it is in fact an inflatable device, this solution is particularly advantageous.

This reduced size allows, in the event of accidental inflation of the inflatable element, less discomfort and risk for a user while driving a vehicle. In other words, a contained expansion of the inflatable element does not affect the control of a vehicle by the user, and therefore does not represent a risk of accident.

Another advantage lies in the fact that by controlling the shape of the inflatable element it is possible to control (and in particular contain) also a quantity of gas necessary for inflating the inflatable element.

According to a preferred aspect of the present disclosure, in order to have a structure as flat as possible, the housings are placed side by side one another, so that portions of the casing body are side by side one another in the mesh structure, or a plurality of casing bodies are side by side one another. In other words, the mesh structure is a single structure including a plurality of housings placed side by side one another. In order to obtain these housings side by side, the mesh structure has inner separating walls or septa, suitably arranged so as to create a plurality of housings.

The inner partitions or walls can be parallel to one another in such a way as to obtain a plurality of housings or channels parallel to each other within the mesh structure.

Preferably, the mesh structure includes a plurality of channels side by side, and a casing body for each channel. The channel has the function of the housing according to this disclosure. The casing body has preferably a tubular shape. It follows that once the casing body has been arranged in the respective channel/housing, each channel has a first region occupied by the casing body, and a second region free and intended to house the casing body in an inflated condition. Since the channels are placed side by side one another, in the inflated condition the individual casing bodies press against each other, to form a cushion of inflated bodies, having a globally planar structure.

In order to make the channels, for example, the tie elements are arranged between said first mesh portion and said second mesh portion aligned in a plurality of rows of tie elements to define a plurality of side-by-side housings. Preferably, each row of tie elements of the plurality of rows of tie elements comprises a plurality of tie elements. The casing body is shaped in such a way as to be arranged in a respective housing between the rows of tie elements.

According to a preferred aspect of the present disclosure, in the condition of at least partial tension, the tie elements extend along a direction of development substantially perpendicular to the direction of extension of the rows of tie elements. According to another preferred aspect of the present disclosure, in the condition of at least partial tension, the tie elements belonging to the same row of tie elements are arranged substantially parallel to each other.

According to a preferred aspect of the present disclosure, the inflatable casing body is hand-shaped or comb-shaped to thus have a plurality of portions arranged between the tie elements.

In an operative embodiment, the casing body is shaped as a tubular or duct body inserted, for example, in a serpentine way between the tie elements, or in a tree shape.

In a further embodiment, a plurality of inflatable casing bodies is provided, each housed between a mesh portion and the opposite mesh portion.

The first mesh portion and the second mesh portion actually define a layer of the inflatable element within which the inflatable casing body is arranged. In an embodiment of the present disclosure, the inflatable element comprises at least a third mesh portion overlapping the first mesh portion and the second mesh portion, to define a second layer of the inflatable element. It is possible arranging portions of the casing body alternately between the two layers in order to control the final shape of the inflatable element in a targeted manner, without occupying too much space between the meshes, and thus ensuring ventilation.

It can therefore be observed that the inflatable element according to the present disclosure lends itself to a high modularity and adaptation to the constructional needs of the protective device.

Further advantages, features and methods of use of the object of the present disclosure will become evident from the following detailed description of the embodiments thereof, presented by way of non-limiting example. It is however evident that each embodiment can present one or more of the advantages listed above; however, each embodiment is not required to simultaneously present all the listed advantages.

Reference will be made to the figures of the accompanying drawings, wherein:

FIG. 3 shows a schematic sectional view along the line II-II of the protective device of FIG. 1A in the inflated condition according to a further embodiment;

FIG. 6 shows a partially sectional schematic view of a protective device according to an embodiment of the present disclosure;

FIG. 7 shows a view of a garment including a personal protective device;

Figures 1, 1A:
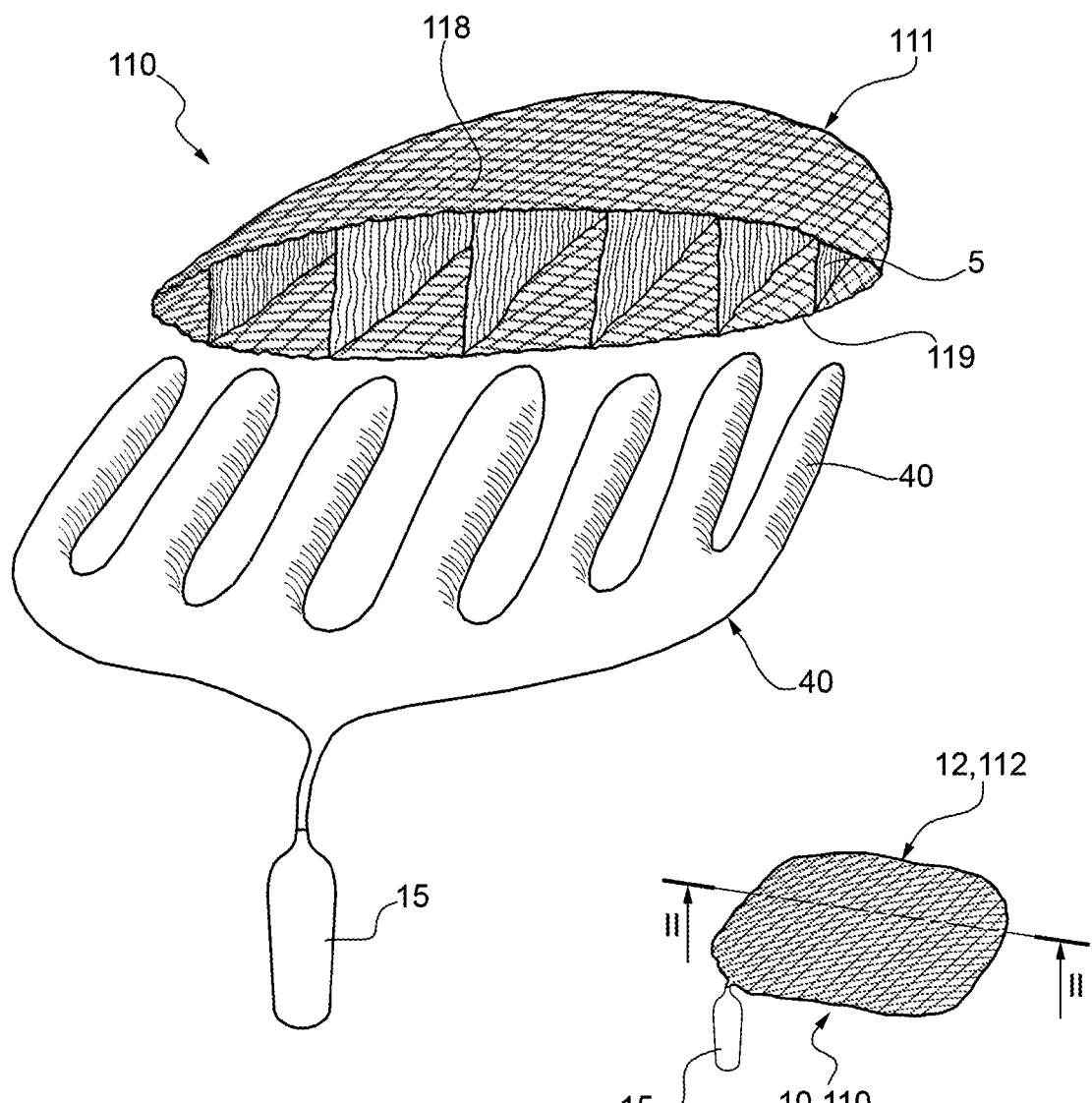
FIG. 1 shows a partially sectional schematic view of a protective device according to an embodiment of the present disclosure.
FIG. 1A shows a schematic view of a protective device according to an embodiment of the present disclosure.
Figure 2:
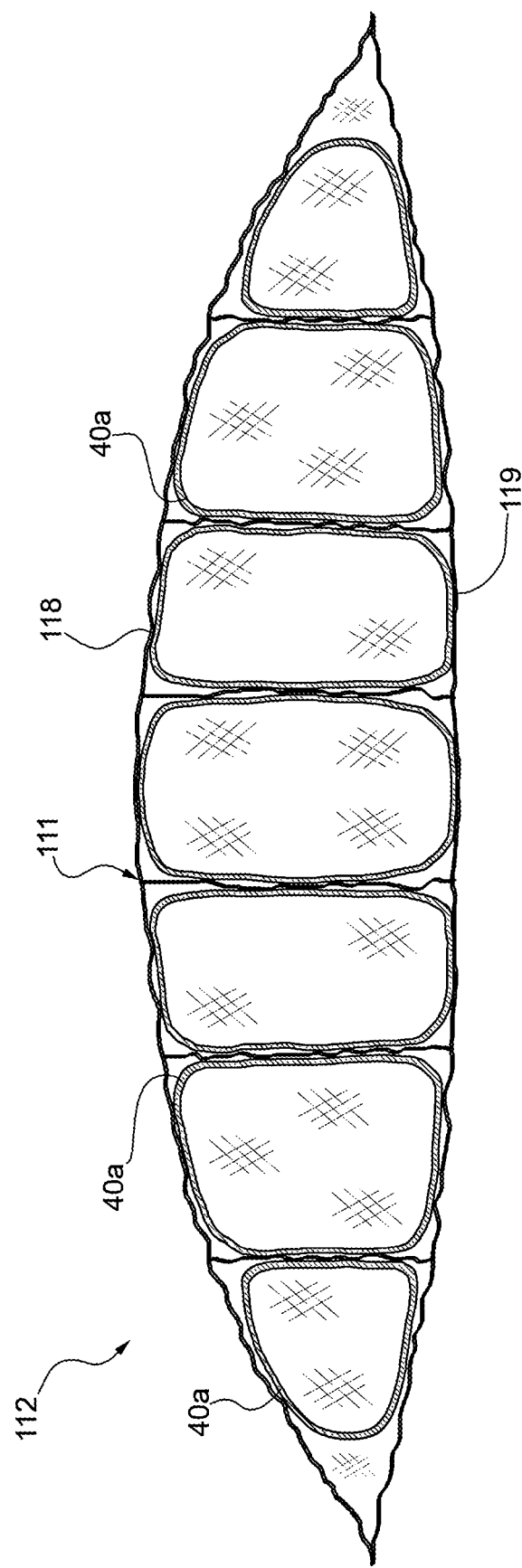
FIG. 2 shows a schematic sectional view along the line II-II of the protective device of FIG. 1A in an inflated condition.
Figure 5:
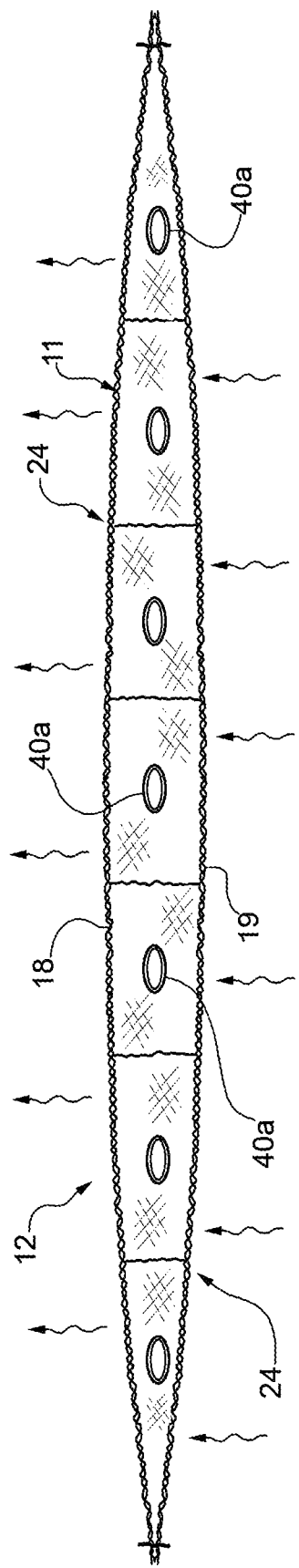
FIG. 5 shows a schematic sectional view along the line II-II of the protective device of FIG. 1A in a deflated condition according to a further embodiment.
Figure 4:
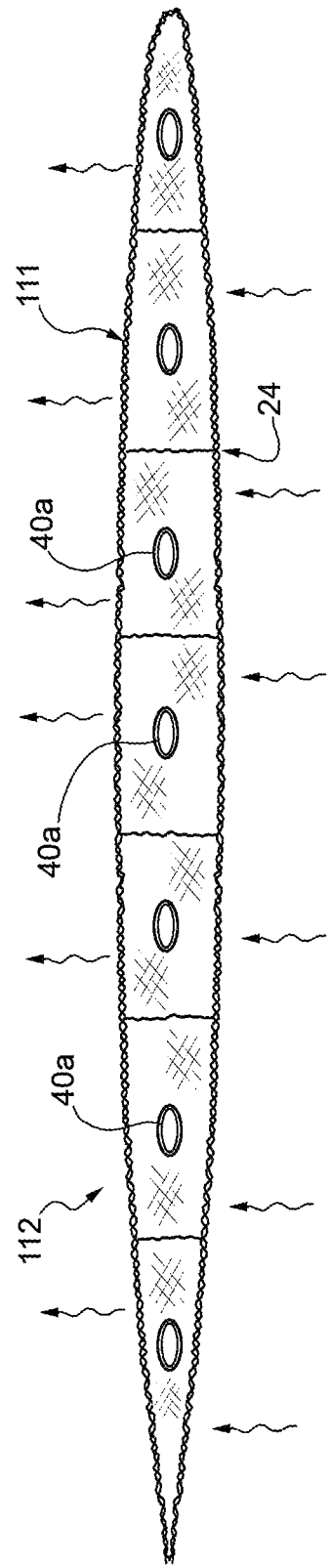
FIG. 4 shows a schematic sectional view along the line II-II of the protective device of FIG. 1A in a deflated condition.

With reference to the attached FIGS. 1-10, the reference number 10, 100 indicates a personal protective device according to the present disclosure in accordance with respective embodiments of the present disclosure. It is preferably a wearable protective device.

The embodiments differ mainly in the textile mesh structure 11, 111 described as will be described below. For identical components having the same structure, the two protective devices keep identical reference numbers.

The personal protective device 10, 110 comprises an inflatable element 12, 112 which is able to substantially assume a first rest condition or deflated condition, and a second active condition or inflated condition. The inflation methods will be described later in the description.

In an embodiment of the present disclosure, the inflatable element 12, 112 can be shaped like a jacket and is apt to surround an upper area or bust of the user's body. Nothing prevents from making the inflatable element 12 according to any shape. The inflatable element 12, 112 includes a mesh textile structure 11, 111, with a first mesh portion 18,118, and a second mesh portion 19, 119, in which the two mesh portions are opposite one another.

The mesh textile structure 11 can be made according to the technology described in the patent application PCT/IB2009/055512 and in the patent application PCT/IT2009/000547, incorporated herein by reference in their entirety in the present disclosure, or the mesh textile structure 111 can be made according to the technology described in the patent application WO2016178143A1, or in the patent application WO2017163196A1, incorporated herein by reference in their entirety in the present disclosure. In other words, it is preferably a mesh textile structure with threads, formed by meshes and tie elements as described in these patent applications. The most significant difference with respect to these patent applications lies in the fact that the inflatable element here described does not have the same external gas containment walls described in the aforementioned patent applications.

More particularly, according to the technology, for example, of the patent application PCT/IB2009/055512, the mesh structure 11 comprises a first mesh portion 18 and a second mesh portion 19 joined along the perimeter. According to the technology of patent application WO2016178143A1, the mesh structure 111 comprises a first mesh portion 118 and a second mesh portion 119 which are part of a mesh casing body made in a single body. What is relevant for the present patent application is the fact that the first mesh portion 118, 18 and the second mesh portion 19, 119 are opposite each other and are connected to each other by a plurality of tie elements 5. Preferably, the tie elements 5 are arranged between said first mesh portion 18 and said second mesh portion 19 aligned in a plurality of rows 24 of tie elements 5. The arrangement in rows 24 allows better regulation of the thread arrangement and further control of the expansion of the inflatable element, as well as forming a plurality of side-by-side housings. Therefore, in the mesh structure 11 there are 111 housings in the shape of channels.

To control even better the expansion of the inflatable element, in active condition, when the inflatable element 2 is in the inflated condition, the tie threads 5 are parallel to each other in the respective row 24 and substantially orthogonal to the direction of the row. The threads are preferably shorter in the edge region, i.e. they decrease in length as they approach the edge region.

Figure 10:
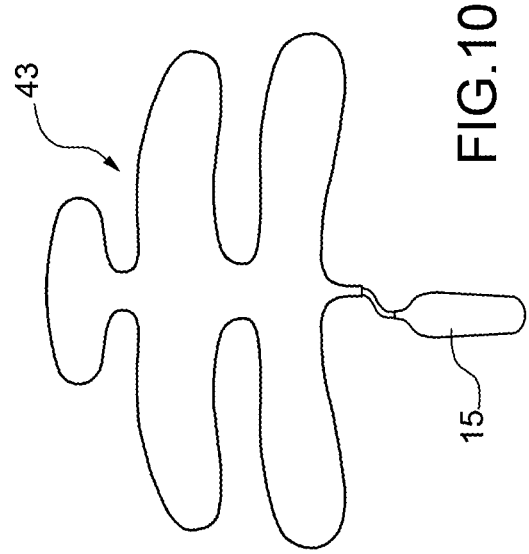
FIG. 10 shows a schematic view of an enclosure for a device according to the present disclosure.

According to an aspect of the present disclosure, the inflatable element 12, 112 comprises an inflatable casing body 40, 42, 43 disposed in one or more housings between the first mesh portion 18, 118, and the second mesh portion 19, 119 and connected to a gas source 15, or inflation source. According to the embodiment of FIG. 1, the inflatable casing body 40 has a hand or comb shape and includes a plurality of portions 40a of the inflatable casing body 40 inserted between the rows of tie elements 5. According to the embodiment of FIG. 6 the inflatable casing body 42 has a tubular shape and is inserted in a serpentine way between the tie elements. In the embodiment of FIG. 10, the casing body has the shape of a tree, that is, it has lateral branches and is also inserted between the channels of a mesh structure 11, 111.

The casing body 40, 42, 43 is in a deflated condition during a rest situation of the inflatable element 2, 102 and occupies the smallest possible space thus allowing the passage of air between the mesh portions 18, 19, 118, 119. At the moment of inflation, the casing body 40, 42, 43 inflates until the tie elements and the mesh portions are tensioned, and thus obtain a maximum tension of the inflatable element. The mesh textile structure 11, 111 actually acts as a containment cage for the casing body 40, 42, 43 in the inflated condition.

It is to be understood that the casing body 40, 42, 43 and the tie elements 5 can be selected and arranged in a suitable way to allow the insertion of the inflatable casing body 40, 42, 43 and the achievement of a desired final shape.

The fact of providing an inflatable casing body 40, 42, 43 with a plurality of portions 40a which are side by side between rows of tie elements 5 allows to obtain a substantially flat final configuration of the inflatable element due to the fact that the various portions 40a in inflated condition are forced to stay side by side, blocked by the mesh portions 18, 118, 19, 119.

Figure 8:
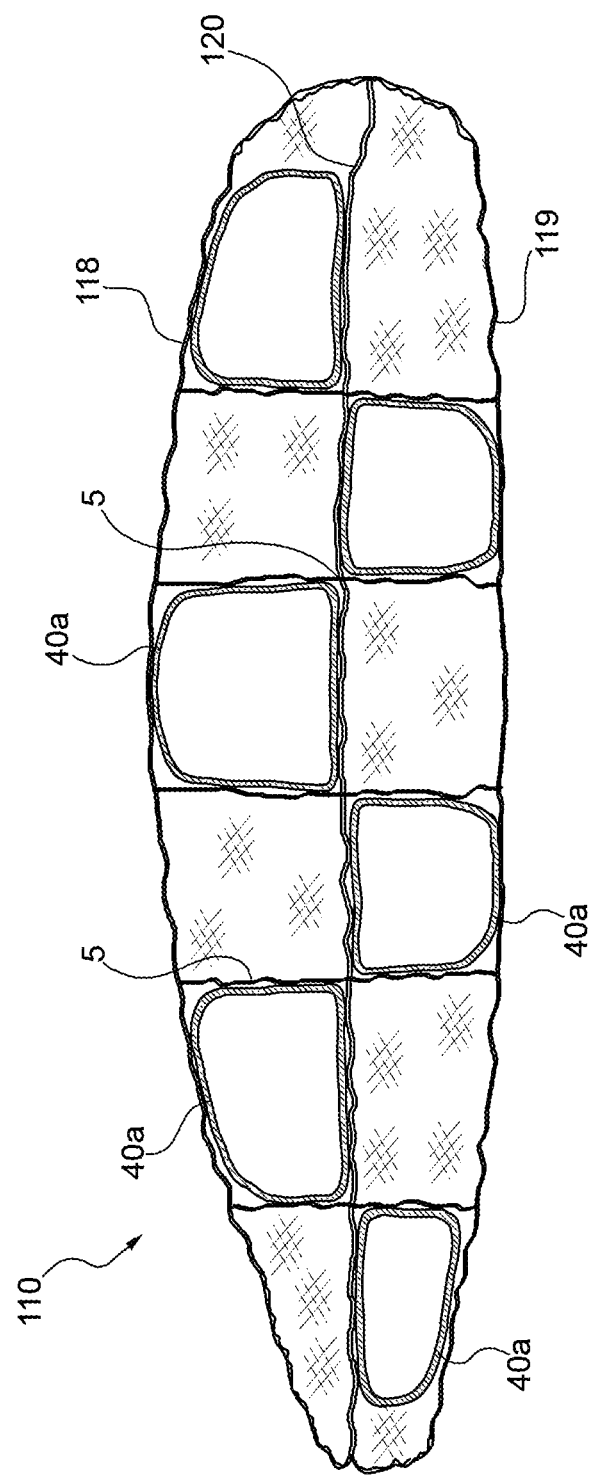
FIG. 8 shows a schematic sectional view along the line II-II of the protective device of FIG. 1A in the inflated condition according to a further embodiment.
Figure 9:
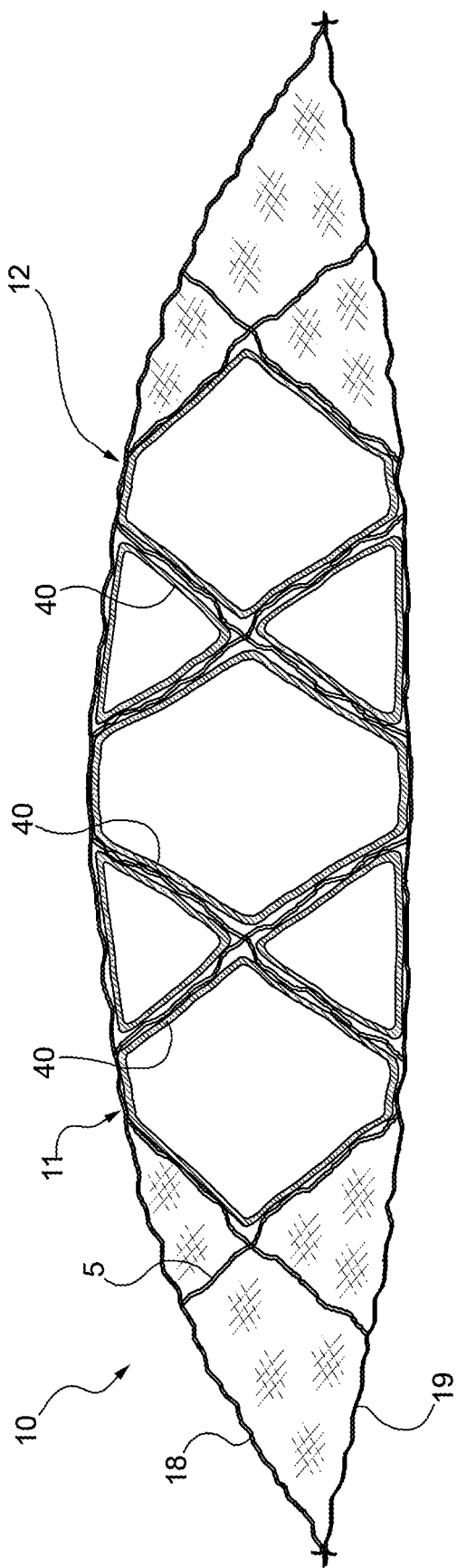
FIG. 9 shows a schematic sectional view along the line II-II of the protective device of FIG. 1A in the inflated condition according to a further embodiment.

In an alternative embodiment such as that of FIG. 8, a third mesh portion 120 overlapped the first mesh portion 118 and the second mesh portion 119 is provided. This third mesh portion 120 allows to make a second layer of inflatable element and therefore make available a plurality of housings for the inflatable casing body 40, 42, 43, and allow an even greater variability of arrangement of the inflatable casing body or of its portions within the mesh textile structure 11, 111.

The present disclosure also relates to a protective garment 50 comprising a protective device 10, 110 as defined above. The protective device 10, 110 can be housed in a garment pocket.

It follows that the garment pocket forms a cover for the protective device 10, 110. For example, the pocket can be made between a covering outer layer of the garment and an inner layer or lining. Alternatively again, the protective device can be simply fixed underneath the covering outer layer, without a real pocket.

The covering layer, in use, is substantially placed over the personal protective device. The covering layer can also be understood as a multilayer structure.

In this case, the garment includes a covering outer layer, which can also be a multilayer structure. The outer layer of the garment can advantageously be made of a breathable material, or include holes or ventilation openings. In other words, and in general, the garment can be made of breathable material and/or material that allows the passage of air through it, that is, that allows ventilation, for example it is a perforated material or has one or more ventilation openings. In other words, the garment preferably has one or more parts made of material suitable for allowing transpiration and/or ventilation. The main advantage of the fact that the casing body in a deflated condition occupies only a part of the mesh structure lies exactly in the fact that the presence of the inflatable element does not affect the characteristics of transpiration and ventilation of the garment.

In this way, when the inflatable element is in an inactive condition, and in fact not used, the casing body forms an additional layer in the garment in a confined way, only in a restricted region of the garment. In the remaining part of the garment (second region of the mesh structure), the casing body does not form an additional layer. It follows that the garment can preserve its own peculiarities and technical characteristics determined by the combination of layers chosen to make the garment, and they can be, as mentioned, suitable for ventilation or transpiration. Such layers include, for example, the lining and the covering surface of the protective device.

The present disclosure also relates to a method for making a protective device 10, 110 for the protection of a user.

The method includes the steps of:
provide an inflatable element 12, 112 configured to assume an active inflated configuration and a rest deflated configuration, wherein said inflatable element 12 comprises a first mesh portion 18 and a second mesh portion 19, 119 opposite the first mesh portion 18, 119 to define at least one inner housing;
connecting said first mesh portion 18 to said second mesh portion 19 with a plurality of tie elements 5 so as to define one or more inner housings;
arrange in the inner housing a casing body 40, 42, 43 and preferably connect the casing body 40, 42, 43 to a gas source to inflate the casing body in an inflated condition.

Preferably in the deflated condition, the casing body 40, 42, 43 occupies a first space or first region, and wherein in said deflated condition a second region or second space of said at least one housing is devoid of said casing body, and in wherein in said inflated condition the casing body expands and occupies the second region or second space.

Preferably, the step of connecting the first mesh portion 18 to the second mesh portion 19 with the plurality of tie elements 5 is carried out by arranging the tie elements 5 aligned in a plurality of rows 24 of tie elements, wherein each row 24 of elements tie elements 5 comprises a plurality of tie element elements 5 and the casing body is arranged between the rows 24.

Actually, the casing body covers the mesh structure 11, 111 from within, without requiring external waterproofing walls.

In relation to inflation, in order to inflate the casing body 40, 42, 43, in the event of a fall and/or slip and/or unexpected impact by a user or a vehicle on which he/she is travelling, the protective device 10, 110 is apt to cooperate with suitable activation means (not shown) operatively connected for example to the gas source 15, such as a can of compressed cold gas, such as for example helium. The can can be provided with a respective shut-off valve (not shown).

Alternatively, the inflation fluid source can comprise gas generators of the pyrotechnic or hybrid type or of other types known to the state of the art.

The opening of the shut-off valve of each inflation can is preferably controlled by a control unit according to the detection of the status of the vehicle/driver system; for example, said control unit can implement a fall prediction system that allows a timely identification of the fall event and a reliable prediction of this by means of accelerometric sensors integral with the vehicle (or driver) and a processing unit of the signals produced by the same sensors.

Alternatively, the device according to the present disclosure can also find application using an activation cable connected to a vehicle driven by a user, which cable controls the inflation of the inflatable element following the distancing of the user from the vehicle, for example, following a fall or an unexpected impact. The use of the cable is particularly used in the horse riding sector.

In any case, the aforementioned activation and inflation means can be integrated into the protective device according to the present invention or located outside the same.

It should also be noted that the activation methods, while being an aspect of particular importance for an effective operation of the device, will not be further described in greater detail, being methods essentially already known to a person skilled in the art of protection of an individual from unexpected impacts.

The object of the present disclosure has so far been described with reference to the embodiments thereof. It is to be understood that there may be other embodiments which relate to the same inventive nucleus, all falling within the scope of protection of the claims provided below.

The invention claimed is:

1. A protective device for the protection of a user, said protective device comprising a mesh structure comprising a first mesh portion and a second mesh portion and a plurality of tie elements, wherein said first mesh portion and said second mesh portion are opposite one another and are connected one another by said plurality of tie elements; wherein said tie elements comprise dividing walls defining a plurality of inner housings between said first mesh portion and said second mesh portion;

wherein said protective device includes a casing body arranged at least in an inner housing of said plurality of inner housings, wherein said casing body is configured to assume a deflated condition and an inflated condition in said at least one inner housing of said mesh structure, and wherein in said deflated condition, said casing body occupies a first space or first region, and wherein in the deflated condition a second region or second space of said at least one inner housing lacks a casing body, and wherein in the inflated condition said casing body occupies the second region or second space, wherein said casing body comprises a plurality of portions each arranged in a corresponding inner housing of said plurality of inner housings, and wherein said plurality of inner housings define channels arranged side-by-side one another and separated from each other by a tie element of said plurality of tie elements, each of said plurality of inner housings configured to house a corresponding portion of said casing body, and wherein in the inflated condition, said portions of said casing body are inflated against said first mesh portion, said second mesh portion, and said tie elements so as to form a planar structure.

2. The protective device according to claim 1, wherein in the inflated condition said casing body is configured to line from the inside, at least partially in contact, said mesh structure and that said mesh structure is an external structure of said protective device.

3. The protective device according to claim 1, wherein in said inflated condition said casing body completely occupies the second region or second space and the first region or first space of said inner housing.

4. The protective device according to claim 1, wherein the deflated condition of said casing body corresponds to a slack and loose condition of said mesh structure and of said tie elements, and wherein the inflated condition of said casing body corresponds to an at least partially tensioned condition of said tie elements and of said first mesh portion and said second mesh portion.

5. The protective device according to claim 1, wherein said casing body has a hand or comb or tree shape, or has tubular shape arranged in a serpentine way.

6. The protective device according to claim 1, wherein said tie elements are arranged between said first mesh portion and said second mesh portion aligned in a plurality of rows of tie elements.

7. The protective device according to claim 6, wherein each row of tie elements of said plurality of rows of tie elements comprises a plurality of tie elements wherein in a condition of at least partial tension, said tie elements belonging to a same row of tie elements are arranged substantially parallel to each other.

8. The protective device according to claim 1, wherein said mesh portions and said casing body define an inflatable element, and wherein an inflated condition of said casing body corresponds to an inflated condition of protection of said inflatable element, and a deflated condition corresponds to a rest condition of said inflatable element, and wherein in the deflated condition said second region of said at least one inner housing is apt to allow a passage of air between said first mesh portion and said second mesh portion passing through said second region of said at least one inner housing.

9. The protective device according to claim 1, comprising a gas source or inflation source connected to said casing body.

10. The protective device according to claim 1, wherein said protective device is a wearable device.

11. A protective garment or clothing accessory comprising said protective device according to claim 1.

12. The protective garment according to claim 11, wherein said protective garment has a covering layer, wherein said covering layer is of breathable material or includes transpiration openings, and wherein said covering layer covers said first region and said second region of said one or more inner housings.

13. The protective device according to claim 1, wherein in the inflated condition said casing body is configured to line from the inside, at least partially in contact, said mesh structure or that said mesh structure is an external structure of said protective device.

14. The protective device according to claim 8, wherein said inflatable element is shaped like a jacket and is apt to surround an upper area or bust of the user's body.

15. The protective device according to claim 1, wherein said mesh structure is a perforated structure that allows air or other gas to pass.

16. The protective device according to claim 1, wherein said mesh structure, or the mesh portion, is a net.

17. The protective device according to claim 1, wherein each portion of said casing body is at least partially received in a corresponding one of said inner housings in both the deflated condition and in the inflated condition.

18. A method for making a protective device for the protection of a user, said method comprising the steps of:
providing a mesh structure comprising a first mesh portion and a second mesh portion, opposite the first mesh portion, and a plurality of tie elements connecting the first mesh portion and the second mesh portion, wherein the tie elements comprise dividing walls defining a plurality of inner housings between the first mesh portion and the second mesh portion;
arranging a casing body with a plurality of portions in the mesh structure to form with the mesh structure an inflatable element, the plurality of portions each arranged in a corresponding inner housing of the plurality of inner housings, and wherein the inner housings form channels arranged side-by-side one another and separated from each other by a tie element of the tie elements, each of the inner housings configured to house a corresponding portion of the casing body; and
inflating the casing body from a first deflated operating condition to a second inflated operating condition, wherein in the inflated condition, the portions of the casing body are inflated against the first mesh portion, the second mesh portion, and the tie elements so as to form a planar structure, wherein in the deflated condition, the casing body occupies a first space or region, and wherein in said deflated condition a second region or second space of the at least one inner housing lacks the casing body, and wherein in the inflated condition the casing body expands and occupies the second region or second space.

19. The method according to claim 18, wherein the casing body is inflated until the tie elements and the mesh structure are tensioned and until the casing body is at least partially adhered to the first mesh portion and the second mesh portion.

20. The method according to claim 18, wherein the casing body is inflated until the mesh structure is tensioned and the mesh structure bridles and prevents a further expansion of the casing body.

21. The method according to claim 18, wherein in the deflated condition the second region of the at least one inner housing allows an air passage between the first mesh portion and the second mesh portion passing through the second region.

22. The method according to claim 18, wherein the casing body is inflated until the tie elements and the mesh structure are tensioned or until the casing body is at least partially adhered to the first mesh portion and the second mesh portion.

* * * * *